March 15, 1966   G. W. DALDER   3,240,218
LINEAR OUTPUT SPEED SENSING DEVICE
Filed Nov. 21, 1962
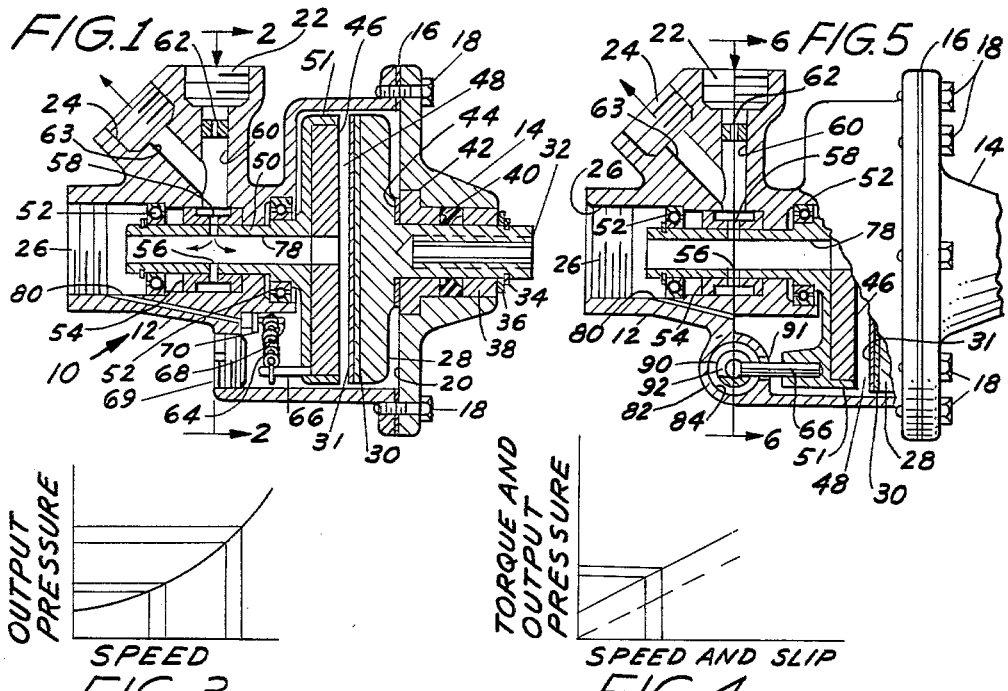
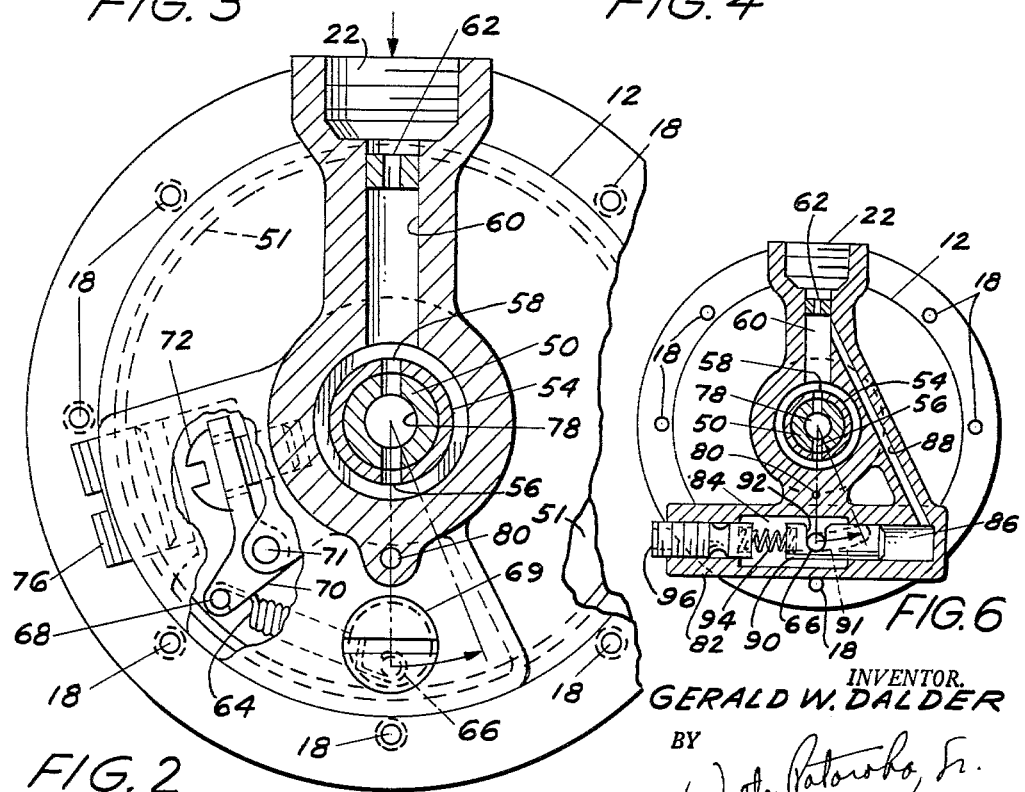
INVENTOR.
GERALD W. DALDER
BY
ATTORNEY

United States Patent Office

3,240,218
Patented Mar. 15, 1966

3,240,218
LINEAR OUTPUT SPEED SENSING DEVICE
Gerald W. Dalder, Royal Oak, Mich., assignor to Holley Carburetor Company, Warren, Mich., a corporation of Michigan
Filed Nov. 21, 1962, Ser. No. 239,230
8 Claims. (Cl. 137—47)

This invention relates generally to speed sensing devices, and more particularly to a speed sensing device adapted for use as a component of a hydromechanical unit such as a gas turbine engine fuel control.

Most hydraulic type speed sensing units presently in use operate on the principle of centrifugal force. This results in an exponential type output curve which typically demonstrates very little change in output pressure for a given change in speed at the low speed end of the curve and greater changes in output pressure for the same change in speed at the high speed end of the curve. However, an exponential output speed sense is obviously undesirable for use in devices operating over low speed ranges.

Accordingly, an object of this invention is to provide a hydraulic type speed sensing unit that will produce an output pressure that varies directly and lineally with speed input.

Other more specific objects and advantages of the invention will become apparent when reference is made to the following description and the accompanying drawings wherein:

FIGURE 1 is a cross-sectional view of a speed sensing unit embodying the invention.

FIGURE 2 is a cross-sectional view taken on the plane of line 2—2 of FIGURE 1 and looking in the direction of the arrows.

FIGURE 3 is a typical exponential Speed vs. Output Pressure curve characteristic of centrifugal force responsive speed sensing units.

FIGURE 4 is a linear Speed vs. Output Pressure curve characteristic of the invention.

FIGURE 5 is a partial cross-sectional view similar to FIGURE 1 but illustrating a modification of the invention.

FIGURE 6 is a cross-sectional view taken on the plane of line 5—5 of FIGURE 5 and looking in the direction of the arrows.

Referring to the drawings in greater detail, FIGURE 1 illustrates a speed sensing unit 10 comprising a main body 12 and an end cap 14 separated by a gasket 16 and fastened together in any suitable manner, such as by bolts 18, to form a main chamber 20. The body 12 includes a high pressure fluid inlet port 22, and outlet port 24, and an outlet 26 to a low pressure return line. The chamber 20 contains a mild steel disc rotor 28 having a copper face 30 and, if required to compensate for loss in magnetic permeability of the mild steel rotor, a layer of material 31 having a magnetic permeability which varies directly with temperature. The rotor 28 is fixedly connected to a driven shaft 32 extending through the end cap 14 and retained laterally by a retaining ring 34 and washer 36. The shaft 32 is, of course, driven by any device of which the speed is to be sensed. Surrounding the shaft 32 in the end cap 14 are a cylindrical bearing 38, a seal 40 and a flanged bearing 42. A thrust bearing 44 is disposed between the armature 28 and the face of the flanged bearing 42.

The chamber 20 also contains a permanent magnet armature 46 retained in a holder 51 so as to maintain a controlled gap 48 between the armature 46 and the copper plated face 30 of the rotor 28. The extension 50 of the magnet holder 51 is rotatably confined within a pair of bearings 52 or other anti-friction support and is surrounded by a sleeve 54. Both the extension 50 and the sleeve 54 contain initially aligned metering ports 56 and 58, respectively, which may at times become misaligned for a purpose which will be explained later. A conduit 60 containing a restriction 62 communicates between the metering ports 56 and 58 and the inlet port 22 and also between the inlet port 22 and a second conduit 63 leading to the outlet port 24.

As better seen in FIGURE 2, rotation of the permanent magnet armature 46 is limited by a tension spring 64, preferably a constant rate spring, connected between a first anchor pin 66 fixedly attached to the magnet holder 51 and a second anchor pin 68 attached to a lever 70 which is pivotally mounted at 71 within the chamber 20. Assembly of the spring 64 is possible through the access opening covered by the plug 69. The lever 70 is manually adjustable about pivot 71 by means of an adjusting screw 72 accessable through an opening 74 in the housing wall by removing the plug 76.

*Operation*

As the rotor 28 is rotated by the shaft 32, slippage occurs between the permanent magnetic armature 46 and the rotor 28, by virtue of the former being restrained from following the rotor 28 by the constant rate spring 64. As this slippage increases, the torque and consequent angular displacement of the armature 46 increase lineally, as illustrated by the dotted line curve FIGURE 4. This is the basic slip-torque characteristic of an eddy current drive. The resultant angular displacement of the extension 50 causes the metering ports 56 and 58 to become misalinged, thereby variably restricting the flow of fluid from the inlet port 22 through the fixed metering ports 58 of the sleeve 54 into the passageway 78 through the center of the extension 50 leading to the low pressure return port 26. This variable restriction to the flow causes the pressure in the conduit 60 leading from the high pressure inlet port 22 to increase. The output pressure through the outlet port 24 is therefore varied directly and lineally with speed input, as is shown by the solid line linear output curve, FIGURE 4. The metering ports 56 and 58 may, for theoretically greater overall accuracy, comprise rectangular slots, in lieu of drilled holes. However, in the normal working range, drilled holes have been found to satisfactorily produce the linear effect just described. This linear result is in contrast to the typical exponential type output result illustrated in FIGURE 3, which is applicable to those speed sensing units that are designed to function in accordance with centrifugal force.

Typically, in an eddy current drive, the greater the slippage between the armature 46 and the rotor 28, the greater the amount of heat generated. Passageway 80 is provided between the chamber 20 and the outlet port 26 in order to continually bleed off the heated fluid, allowing fresh fluid to enter the chamber 20 via the central passageway 78. The copper plated face 30 aids materially in dissipating the heat from the rotor 28 into the fluid in the chamber 20, and thence through the passageway 80 as just explained.

It should be readily apparent from the linear output speed sense curve of FIGURE 4, that the same pressure increases will result from given speed change increments throughout the entire speed range.

Inasmuch as control sensibility relative to speed change is considerably greater at the low speed end of a linear output curve (FIGURE 4) than it is at the low speed end of an exponential type output curve (FIGURE 3), the linear output type speed sensing unit is especially desirable for controls in which low speed operation is just as critical as high speed operation. Otherwise, erratic operation of the control may be experienced in the lower speed range.

While the open loop system described above provides a good low speed sense, a more accurate closed loop system would be possible by making use of the modification illustrated in FIGURES 5 and 6. In this embodiment, the housing 12 includes a portion 82 which forms chambers 84 and 86. A conduit 88 communicates between the chamber 86 and the conduit 60, downstream of the restriction 62. The end of the feedback piston 90 slidably mounted in the chamber 86 that extends into the chamber 84 is formed with an open transverse slot to receive the pin 66 secured to the magnet holder 51. Thus, the piston 90 is moved axially as the pin 66 is moved in an arc by the magnet holder 51 through the arcuate slot 91 due to the torque imposed on the armature 46 by the rotor 28. As the pin traverses its arc, it is free to slide vertically in the open slot 92 of the moving piston 90. The positive rate spring 94 between the piston 90 and an adjustment screw 96 determines the initial position of piston 90 and relationship of the ports 56 and 58. The spring 94 thus provides for a variable initial starting point of the linear curve, FIGURE 4, the exact point depending upon the setting of the adjustment screw 96, inasmuch as the constant spring force is, in addition to the torque, acting on the piston 90.

In the operation of this closed loop system of FIGURES 5 and 6, the metering ports 56 and 58 are normally fully aligned at the start of the operation, depending upon the adjustment of the spring 94 selected. These ports progressively close as the speed of the rotor increases, causing the pressure to increase in the conduit 60. When this occurs, the increased pressure will be communicated via the conduit 88 to the chamber 86, directly opposing the movement of the anchor pin 66 resulting from the torque imposed on the armature 46 by the rotor 28, thereby tending to open the metering ports 56 and 58 and to bring the system into equilibrium. Equilibrium of this closed loop system is reached when the force exerted by the feedback piston 90 in response to the pressure communicated from the conduit 60, balances the torque exerted on the armature 46 by the rotor 28.

In summary it can be seen that with either of the above speed sensing systems, an output pressure will be produced which varies directly and lineally with the input speed, the closed loop system normally being the more exact.

Although but two embodiments of the invention have been shown and described, it is conceivable that other modifications may be made without exceeding the scope of the appended claims.

What I claim as my invention is:

1. A hydraulic output speed sensing device, comprising a body formed to provide a high pressure inlet communicating with a high pressure outlet, a low pressure outlet, a pair of initially aligned orifice members providing communication between said high pressure outlet and said low pressure outlet, one of said orifice members being movable with respect to said other orifice member so as to be capable of progressively restricting communication between said two outlets, and a linear type speed sense actuator for said movable orifice member so as to restrict said communication and increase said high pressure output directly and lineally with increasing speed and vice-versa without changing said inlet pressure or said low pressure.

2. A hydraulic pressure speed sensing device comprising a speed input means, an eddy current drive means responsive to said speed input means for producing a torque, a plurality of metering ports tending to be misaligned by said torque, resilient means for urging said plurality of metering ports into alignment, an inlet from a source of pressure and an outlet, said metering ports serving to vary outlet pressure in direct linear relation with said torque without regard to inlet pressure.

3. A hydraulic pressure speed sensing device comprising a speed input means, an eddy current drive means responsive to said speed input means for producing a torque, a plurality of metering ports tending to be misaligned by said torque, feedback means for opposing said torque, an inlet from a source of pressure and an outlet, said metering ports serving to vary outlet pressure in direct linear relation with said torque with inlet pressure remaining constant.

4. A hydraulic speed sensing device comprising a housing and an end cap forming a chamber therein, a speed input shaft extending through said end cap, a rotor having a copper facing in said chamber fixedly attached to said speed input shaft, a plurality of bearings and a seal surrounding said speed input shaft, a permanent magnet armature in said chamber separated by a controlled distance from said copper facing, an extension fixedly connected to said permanent magnet armature, said extension being rotatably confined in said housing by a second plurality of bearings and surrounded by a sleeve, a first plurality of metering ports through the wall of said sleeve, a second plurality of metering ports through the wall of said extension for at times being aligned with said first plurality of metering ports, an inlet port in said housing, a first conduit containing a restriction communicating between said inlet port and said first and second plurality of metering ports, an outlet port in said housing, a second conduit communicating between said outlet port and said first conduit, an anchor pin fixedly attached to said permanent magnet armature, a third conduit communicating between said first conduit and a chamber having a piston slidably mounted therein, said piston being connected to said anchor pin for lateral movement therewith.

5. A closed loop speed sensing device comprising a speed input means, an eddy current drive means responsive to said speed input means for producing a torque, an inlet from a source of pressure, an outlet for transmitting said pressure in accordance with the speed of said speed input means, a plurality of metering ports, said metering ports being misaligned by said torque, an anchor pin associated with said eddy current drive and being moved in an arc by said torque, a feedback piston being moved laterally by said anchor pin and a conduit means for communicating the pressure in said outlet to said feedback piston for moving said piston in opposition to the movement of said anchor pin in said arc.

6. A hydraulic speed sensing device comprising a housing having a longitudinal opening therethrough and a chamber therein, a rotor and a permanent magnetic armature in said chamber separated by a controlled gap, a sleeve press fitted into said longitudinal opening and having a first metering port movable in response to movement of said permanent magnetic armature, resilient means for urging said second metering port into alignment with said first metering port, an inlet port in said housing for receiving fluid under pressure and outlet port in said housing for discharging fluid under pressure, a conduit communicating between said inlet port, said outlet port, and said first and second metering ports, and a speed input means for driving said armature to change the pressure through said outlet port with inlet pressure remaining constant.

7. A hydraulic output speed sense device, comprising a body formed to provide a high pressure inlet communicating with a high pressure outlet, a low pressure outlet, a pair of initially aligned orifice members providing communication between said high pressure inlet and said low pressure outlet, a speed input means, and means for moving one of said orifice members in response to movement of said speed input means for changing the pressure in said high pressure outlet only.

8. A hydraulic output speed sense device, comprising a body formed to provide a high pressure inlet, a high pressure outlet, a low pressure outlet, a conduitry system communicating between said inlet and said outlets, a speed input means, and eddy current drive means for changing the pressure in said high pressure outlet only in response to movement of said input means.

References Cited by the Examiner

UNITED STATES PATENTS

| | | | |
|---|---|---|---|
| 1,508,464 | 9/1924 | McFarland | 137—47 |
| 2,364,810 | 12/1944 | Noxon | 137—30 X |
| 2,414,947 | 1/1947 | Heinze | 137—47 |
| 2,475,178 | 7/1949 | Church | 137—56 X |
| 2,858,839 | 11/1958 | Jackson | 137—56 |
| 3,108,221 | 10/1963 | Peltola | 73—519 X |
| 3,109,457 | 11/1963 | Oliveau | 251—172 X |
| 3,111,037 | 11/1963 | Wallis | 73—519 |

ISADOR WEIL, *Primary Examiner.*

CLARENCE R. GORDON, *Examiner.*